United States Patent
Rao et al.

(10) Patent No.: US 10,348,752 B2
(45) Date of Patent: Jul. 9, 2019

(54) SYSTEM AND ARTICLE OF MANUFACTURE TO ANALYZE TWITTER DATA TO DISCOVER SUSPICIOUS USERS AND MALICIOUS CONTENT

(71) Applicant: THE UNITED STATES OF AMERICA AS REPRESENTED BY TE SECRETARY OF THE AIR FORCE, Washington, DC (US)

(72) Inventors: Praveen Rao, Overland Park, KS (US); Charles Kamhoua, Liverpool, NY (US); Laurent Njilla, Rome, NY (US); Kevin Kwiat, Whitesboro, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 237 days.

(21) Appl. No.: 15/585,397

(22) Filed: May 3, 2017

(65) Prior Publication Data
US 2018/0324196 A1  Nov. 8, 2018

(51) Int. Cl.
*H04L 29/06* (2006.01)
*H04L 29/08* (2006.01)
*G06N 5/04* (2006.01)
*G06N 20/00* (2019.01)

(52) U.S. Cl.
CPC .......... *H04L 63/1425* (2013.01); *G06N 5/04* (2013.01); *G06N 20/00* (2019.01); *H04L 67/02* (2013.01)

(58) Field of Classification Search
CPC .................................................. H04L 63/1425
USPC .......................................................... 726/23
See application file for complete search history.

(56) References Cited

U.S. PATENT DOCUMENTS

| 8,938,783 B2 * | 1/2015 | Becker .................... G06F 21/62 726/4 |
| 2015/0254566 A1 * | 9/2015 | Chandramouli ........ G06F 17/27 706/11 |
| 2016/0224637 A1 * | 8/2016 | Sukumar ............. G06F 16/2465 |

OTHER PUBLICATIONS

Y. Chen and D. Z. Wang. Knowledge Expansion over Probabilistic Knowledge Bases. In Proc. of the 2014 ACM SIGMOD Conference, pp. 649-660, 2014.

(Continued)

*Primary Examiner* — Longbit Chai
(74) *Attorney, Agent, or Firm* — Joseph A. Mancini

(57) ABSTRACT

The invention comprises a system and article of manufacture to discover potential cyber threats on Twitter. The invention provides a unified framework for modeling and reasoning about the veracity of tweets to discover suspicious users and malicious content. The invention builds on the concept of Markov logic networks (MLNs) for knowledge representation and reasoning under uncertainty.

32 Claims, 12 Drawing Sheets

(56) References Cited

OTHER PUBLICATIONS

F. Niu, C. R'e, A. Doan, and J. Shavlik. Tuffy: Scaling Up Statistical Inference in Markov Logic Networks Using an RDBMS. Proc. VLDB Endowment, 4(6):373-384, Mar. 2011.

P. Rao, A. Katib, C. Kamhoua, K. Kwiat, and L. Njilla. Probabilistic Inference on Twitter Data to Discover Suspicious Users and Malicious Content. In Proc. of the 2nd IEEE International Symposium on Security and Privacy in Social Networks and Big Data (SocialSec), pp. 1-8, Fiji, 2016.

M. Richardson and P. Domingos. Markov Logic Networks. Machine Learning, 62(1-2):107-136, Feb. 2006.

K. Thomas and D. M. Nicol. The Koobface Botnet and the Rise of Social Malware. In Proc. of the 5th International Conference on Malicious and Unwanted Software (MALWARE), pp. 63-70, Oct. 2010.

\* cited by examiner

|     | Predicate | Type |
| --- | --- | --- |
| 201 | tweeted(userID, tweetID) | CWA |
| 202 | containsLink(tweetID, link) | CWA |
| 203 | mentions(tweetID, userID) | CWA |
| 204 | retweeted(userID, tweetID) | CWA |
| 205 | containsHashtag(tweetID, hashtag) | CWA |
| 206 | verified(userID) | CWA |

|     | Predicate | Type |
| --- | --- | --- |
| 207 | malicious(link) | OWA |
| 208 | friend(userID1,userID2) | OWA |
| 209 | trending(hashtag) | OWA |
| 210 | attacker(userID) | OWA |
| 211 | isFollowedBy(userID1,userID2) | OWA |
| 212 | isPossiblySensitive(tweetID) | OWA |

|     | Predicate | Type |
| --- | --- | --- |
| 213 | friendsCount(userID,count) | CWA |
| 214 | followersCount(userID,count) | CWA |
| 215 | statusesCount(userID,count) | CWA |
| 216 | retweetCount(tweetID,count) | CWA |
| 217 | favouritesCount(userID,count) | CWA |

FIGURE 2

| | Predicate | Type |
|---|---|---|
| 301 | tweetedT(userID, tweetID, Δ) | CWA |
| 302 | trendingT(hashtag, Δ) | OWA |
| 303 | followersCountT(userID, count, Δ) | CWA |
| 304 | friendsCountT(userID, count, Δ) | CWA |
| 305 | favouritesCountT(userID, count, Δ) | CWA |
| 306 | statusesCountT(userID, count, Δ) | CWA |
| 307 | retweetCountT(tweetID, count, Δ) | CWA |

FIGURE 3

| 401 | $f_1$ | tweeted(userID1,tweetID) ∧ mentions(tweetID,userID2) ⇒ friend(userID1,userID2) |
| --- | --- | --- |
| 402 | $f_2$ | retweeted(userID1,tweetID) ∧ tweeted(userID2,tweetID) ⇒ friend(userID1,userID2) |
| 403 | $f_3$ | tweeted(userID,tweetID) ∧ containsHashtag(tweetID,hashtag) ∧ attacker(userID) ⇒ trending(hashtag) |
| 404 | $f_4$ | isFollowedBy(userID1,userID2) ∧ verified(userID2) ⇒ verified(userID1) |

| 405 | $f_5$ | verified(userID) ⇒ !attacker(userID) |
| --- | --- | --- |
| 406 | $f_6$ | verified(userID1) ∧ friend(userID1,userID2) ∧ isFollowedBy(userID1,userID2) ⇒ !attacker(userID2) |
| 407 | $f_7$ | tweeted(userID,tweetID) ∧ containsLink(tweetID,link) ∧ malicious(link) ⇒ attacker(userID) |
| 408 | $f_8$ | attacker(userID1) ∧ friend(userID1,userID2) ∧ isFollowedBy(userID1,userID2) ⇒ attacker(userID2) |
| 409 | $f_9$ | !attacker(userID1) ∧ tweeted(userID1,tweetID) ∧ mentions(tweetID,userID2) ⇒ !attacker(userID2) |
| 410 | $f_{10}$ | tweeted(userID,tweetID) ∧ isPossiblySensitive(tweetID) ⇒ attacker(userID) |

| 411 | $f_{11}$ | containsLink(tweetID,link) ∧ (contains(link, ¢)) ⇒ !malicious(link) |
| --- | --- | --- |
| 412 | $f_{12}$ | containsLink(tweetID,link) ∧ isPossiblySensitive(tweetID) ⇒ malicious(link) |
| 413 | $f_{13}$ | attacker(userID) ∧ tweeted(userID,tweetID) ∧ containsLink(tweetID,link) ⇒ malicious(link) |
| 414 | $f_{14}$ | containsLink(tweetID,link) ∧ malicious(link) ⇒ isPossiblySensitive(tweetID) |
| 415 | $f_{15}$ | attacker(userID) ∧ tweeted(userID,tweetID) ⇒ isPossiblySensitive(tweetID) |

The existential quantifier ∃ on each variable in a formula is implied. In the above formulas, ¢ is a string such as "https://t.co/", "https://instagram.com", etc.

FIGURE 4

| 501 | $f_{16}$ | !verified(user) ∧ followersCount(user, count1) ∧ friendsCount(user, count2) ∧ (count1 != 0 AND count2/count1 > m) ⇒ attacker(user) |
|---|---|---|
| 502 | $f_{17}$ | !verified(user) ∧ statusesCount(user, count1) ∧ friendsCount(user, count2) ∧ (count1 != 0 AND count2/count1 > m) ⇒ attacker(user) |
| 503 | $f_{18}$ | !verified(user) ∧ statusesCount(user, count1) ∧ followersCount(user, count2) ∧ (count1 != 0 AND count2/count1 > m) ⇒ attacker(user) |
| 504 | $f_{19}$ | !verified(user) ∧ statusesCount(user, count1) ∧ favouritesCount(user, count2) ∧ (count1 != 0 AND count2/count1 > m) ⇒ attacker(user) |

| 505 | $f_{20}$ | friendsCountT(user, count1, $\Delta_1$) ∧ friendsCountT(user, count2, $\Delta_2$) ∧ ($\Delta_2 - \Delta_1$ <= $\Omega$ AND count1 != 0 AND count2/count1 > m) ⇒ attacker(user) |
|---|---|---|
| 506 | $f_{21}$ | trendingT(hashtag, $\Delta_1$) ∧ tweetedT(user, tweet, $\Delta_2$) ∧ containsHashtag(tweet, hashtag) ∧ containsLink(tweet, link) ∧ attacker(user) ∧ ($\Delta_1 < \Delta_2$) ⇒ malicious(link) |
| 507 | $f_{22}$ | trendingT(hashtag, $\Delta_1$) ∧ tweetedT(user1, tweet, $\Delta_2$) ∧ mentions(tweet, user2) ∧ !isFollowedBy(user2, user1) ∧ ($\Delta_1 < \Delta_2$) ⇒ attacker(user1) |
| 508 | $f_{23}$ | trendingT(hashtag, $\Delta_1$) ∧ tweetedT(user1, tweet, $\Delta_2$) ∧ mentions(tweet, user2) ∧ !friend(user2, user1) ∧ ($\Delta_1 < \Delta_2$) ⇒ attacker(user1) |

The existential quantifier ∃ on each variable in a formula is implied. In the above formulas, m and $\Omega$ are integer constants.

FIGURE 5

SYSTEM AND ARTICLE OF MANUFACTURE TO ANALYZE TWITTER DATA TO DISCOVER SUSPICIOUS USERS AND MALICIOUS CONTENT

STATEMENT OF GOVERNMENT INTEREST

The invention described herein may be manufactured and used by or for the Government for governmental purposes.

BACKGROUND OF THE INVENTION

The power of social media is undeniable: may it be in a marketing or political campaign, sharing breaking news, or during catastrophic events. Unfortunately, social media has also become a major weapon for launching cyberattacks on an organization and its people. By hacking into accounts of (popular) users, hackers can post false information, which can go viral and lead to economic damages and create havoc among people. Another major threat on social media is the spread of malware through social media posts by tricking innocent users to click unsuspecting links [5]. Due to these reasons, organizations are developing policies for usage of social media and investing a lot of money and resources to secure their infrastructure and prevent such attacks.

Ascertaining the veracity (or trustworthiness) of social media posts is becoming very important today. For this, one must consider both the content as well as users' behavior. However, there are technical challenges that arise in designing a suitable method or system that can model and reason about the veracity of social media posts. The first challenge is to represent the complex and diverse social media data in a principled manner. For example, a tweet is a 140-character message posted by users on Twitter. It is represented using 100+ attributes, and attribute values can be missing and noisy. New attributes may appear in tweets; some attributes may not appear in a tweet. Hashtags, which begin with the # symbol, are used frequently by users in tweets to indicate specific topics or categories. There are thousands of hashtags in use today; the popularity of a hashtag changes over time. Some hashtags may become trending/popular during a particular time period. The second challenge is to construct a knowledge base (KB) on social media posts. The goal is to learn the entities, facts, and rules from a large number of posts. The third challenge is to reason about the veracity of the posts using the KB containing a large number of entities and facts. Thus, suspicious content/activities can be flagged as soon as possible to discover emerging cyber threats.

The invention described herein presents a system to solve the above challenges to discover cyber threats on Twitter [3]. The system provides a unified framework for modeling and reasoning about the veracity of tweets to discover suspicious users and malicious content. The system builds on the concept of Markov logic networks (MLNs) for knowledge representation and reasoning under uncertainty [4]. It can be used to analyze both the behavior of users and the nature of their posts to ultimately discover potential cyberattacks on social media. The nature of cyberattacks on social media is quite complex: It can range from posting of malicious URLs to spread malware, to posting of misleading/false information to create chaos, to compromise of innocent users' accounts. The system embodies a KB over tweets—to capture both the behavior of users and the nature of their posts. The KB contains entities, their relationships, facts, and rules. Via probabilistic inference on the KB, the system can identify malicious content and suspicious users on a given collection of tweets.

There are a few recent patented methods or systems to detect attacks on social networks such as for preventing coalition attacks [US 20140059203], preventing an advanced persistent threat (APT) using social network honeypots [US 20150326608], detecting undesirable content in a social network [US 20130018823], and preventing spread of malware in social networks [U.S. Pat. No. 9,124,617]. However, there is no published method or system that has (a) employed MLNs for modeling tweets and users' behavior as a KB and (b) applied probabilistic inference on the KB for discovering suspicious users and malicious content.

OBJECTS AND SUMMARY OF THE INVENTION

The features and advantages described in this summary and the following detailed description are not all-inclusive. Many additional features and advantages will be apparent to one of ordinary skill in the art in view of the drawings, specification, and claims hereof.

In the present invention, a system and article of manufacture have been devised to model tweets using a KB so that suspicious users and malicious content can be detected via probabilistic inference. The invention solves the problem of representing complex, diverse nature of tweets in a principled manner. It enables the modeling of various kinds of possible attacks by adversaries on Twitter using first-order logic within a single unified framework. An embodiment of the invention enables the detection of suspicious users and malicious content on Twitter. The invention uses the concept of MLNs to learn the likelihood of rules being satisfied or unsatisfied given a training set of tweets. The invention uses probabilistic inference to process inference queries on the KB to discover suspicious users and malicious content over a large collection of tweets.

It is therefore an object of the present invention to model the complex, diverse nature of tweets and external data sources in a principled manner.

It is also the object of the present invention to construct a KB to capture users' behavior and type of content to enable the discovery of cyber threats via Twitter.

It is yet another object of the present invention to reason over the learned KB via probabilistic inference to identify suspicious users and malicious content and present high quality information to the user.

According to an embodiment of the present invention, a system for analyzing Twitter data to discover suspicious users and malicious content, comprises at least one computer server executing a plurality of programming instructions stored therein; at least one source of externally stored data; a communications channel for receiving tweets from Twitter; and a user interface for querying the system; and where the programming instructions configured to program the computer server to perform tasks, where the tasks further comprising communicating with at least one source of external data, the communications channel for receiving tweets from Twitter, and with the user interface so as to identify and output suspicious Twitter users and malicious Twitter content.

According to another embodiment of the present invention, an article of manufacture comprises a non-transitory storage medium having a plurality of programming instructions stored therein, with the programming instructions configured to program an apparatus to implement on the apparatus one or more subsystems or services to analyze Twitter data to discover suspicious users and malicious content by collecting tweets from Twitter; flagging malicious and benign URLs and domains; generating ground predicates based on the tweets, the flagged URLs and domains, and based on a knowledge base of predicates and formulas; generating a subset of the ground predicates based on an input set of queries; learning weights of the formulas based on the subset of ground predicates, the tweets, and the knowledgebase; updating the knowledgebase to contain first order predicates and formulas associated with the tweets and Twitter users by implementing a Markov Logic Network process on the learned weights; performing probabilistic inference on the queries based on the updated knowledgebase; combining results; and outputting suspicious Twitter users and malicious Twitter content.

Briefly stated, the present invention comprises a system and article of manufacture to discover potential cyber threats on Twitter. The invention provides a unified framework for modeling and reasoning about the veracity of tweets to discover suspicious users and malicious content. The invention builds on the concept of Markov logic networks (MLNs) for knowledge representation and reasoning under uncertainty.

REFERENCES

[1] Y. Chen and D. Z. Wang. Knowledge Expansion over Probabilistic Knowledge Bases. In Proc. of the 2014 ACM SIGMOD Conference, pages 649-660, 2014.

[2] F. Niu, C. R'e, A. Doan, and J. Shavlik. Tuffy: Scaling Up Statistical Inference in Markov Logic Networks Using an RDBMS. Proc. VLDB Endowment, 4(6):373-384, March 2011.

[3] P. Rao, A. Katib, C. Kamhoua, K. Kwiat, and L. Njilla. Probabilistic Inference on Twitter Data to Discover Suspicious Users and Malicious Content. In Proc. of the 2nd IEEE International Symposium on Security and Privacy in Social Networks and Big Data (SocialSec), pages 1-8, Fiji, 2016.

[4] M. Richardson and P. Domingos. Markov Logic Networks. Machine Learning, 62(1-2):107-136, February 2006.

[5] K. Thomas and D. M. Nicol. The Koobface Botnet and the Rise of Social Malware. In Proc. of the 5th International Conference on Malicious and Unwanted Software (MALWARE), pages 63-70, October 2010.

BRIEF DESCRIPTION OF THE DRAWINGS

FIG. 2 depicts, in an embodiment of the present invention, a set of first-order predicates in the KB to model tweets. Some of these predicates make a closed-world assumption (CWA) and the others an open-world assumption (OWA).

FIG. 3 depicts, in an embodiment of the present invention, a set of first-order predicates in the KB to model tweets. These are temporal predicates and enable the modeling of time-based events. These formulas are powerful to model a sequence of activities, which can be exploited by adversaries to launch cyberattacks.

FIG. 4 depicts, in an embodiment of the present invention, a set of first-order formulas in the KB to (a) infer friendship relations, trending hashtags, and verified users; (b) whether a user is an attacker/suspicious user or not; and (c) whether a link is malicious or not and whether a tweet is possibly sensitive or not.

FIG. 5 depicts, in an embodiment of the present invention, a set of first-order formulas in the KB to (a) infer attackers based on counts related to followers, friends, statuses, and favorites; and (b) infer attackers and malicious links based on temporal predicates.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENT

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

BACKGROUND

Here a background on tweets and their attributes and content is presented. A tweet is a 140-character message posted by a user on Twitter. It contains a lot of additional information when downloaded from Twitter. It is rich in information and diverse in the sense that it may contain 100+ attributes, and new attributes may appear over time. Each tweet is assigned a unique ID; each user account is also assigned a unique ID. In subsequent discussions, the terms "a user" and "a user account" will be used interchangeably to mean the same thing. There are attributes whose values embed the actual text of a tweet, the URLs contained in a tweet, hashtags used in a tweet, and so on. There are attributes that provide counts about the number of friends of a user, the number of followers of a user, the number of tweets liked/favorited by a user (i.e., favorites count), and the number of posts of a user (i.e., statuses count). Note that a tweet does not contain the list of friends or followers of a user. Nor does it contain information about hashtags that are trending. These pieces of information, however, can be obtained using Twitter REST APIs.

System Components

Figure 1:
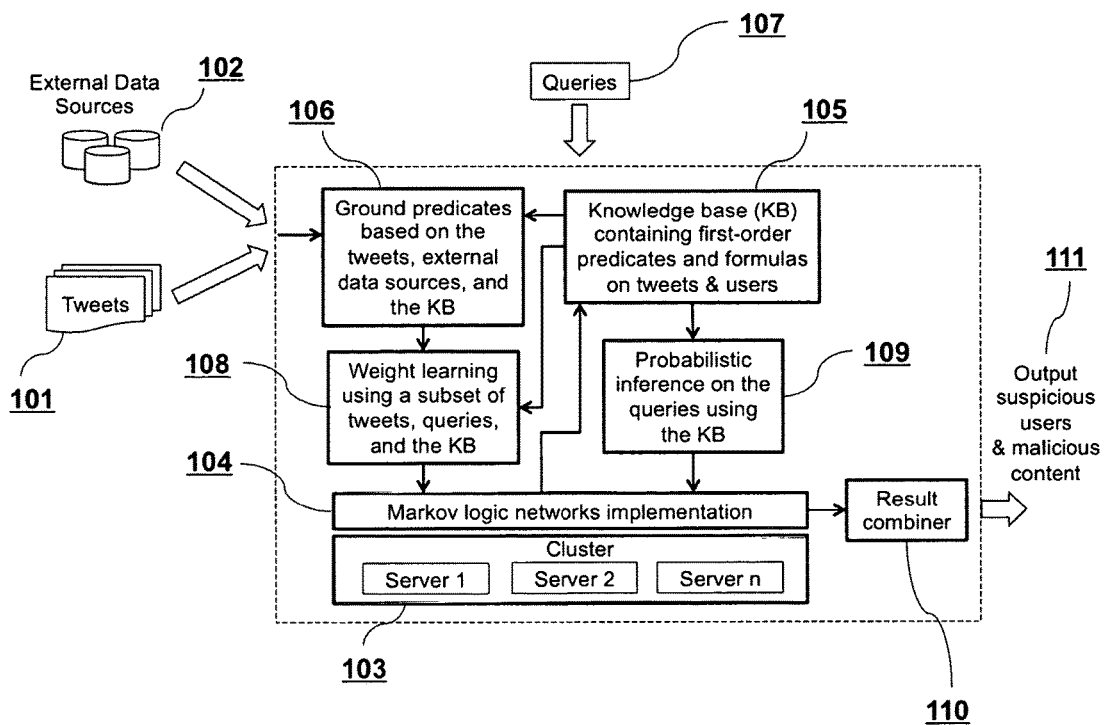
FIG. 1 depicts, in an embodiment of the present invention, a system for modeling tweets, learning a KB, and reasoning about suspicious users and malicious content using the KB via probabilistic inference.

Here the system components and the overall method embodied by the present invention are depicted in FIG. 1. Tweets 101 are collected from Twitter. External data sources 102 (e.g., URLBlacklist.com, VirusTotal) are used to flag malicious and benign URLs and domains. The invention can run in a cluster of commodity servers 103 or a single machine [3]. The invention can use existing scalable implementations for MLNs 104 (e.g., Tuffy [2], ProbKB [1]). It contains a KB with first-order predicates and formulas 105. A grounding of a formula (or predicate) is obtained by replacing all its variables by constants. The obtained formula (or predicate) is called a ground formula (or ground predicate). Based on the predicates in the KB, tweets, and external data sources, ground predicates are generated 106. A set of queries is specified 107. Given this set of queries, a subset of ground predicates is used for learning the weights of the formulas 108. Next, the entire set of ground predicates is used to perform probabilistic inference (e.g., maximum a posteriori (MAP) inference, marginal inference) for the queries using the KB 109. The outputs from the MAP and marginal inference are combined in a unique way 110 to output suspicious users and malicious content 111.

Predicates and Formulas in the Knowledge Base

Here the KB, a core component of the invention, is discussed. The KB contains two parts: first-order predicates and first-order formulas. Due to the richness of information in tweets and complex relationships between entities in them, the invention defines a set of different types of predicates in the KB. A predicate can make a closed-world assumption (CWA) or an open-world assumption (OWA). CWA assumes that what is not known to be true must be false. On the other hand, OWA assumes that what is not known may be or may not be true.

FIG. 2 shows the first set of predicates with non-temporal attributes in the KB. The predicate tweeted(userID,tweetID) 201 states whether a user posted a particular tweet or not; containsLink(tweetID,link) 202 states whether a tweet contains a particular URL or not; mentions(tweetID,userID) 203 states whether a particular user is mentioned in a tweet (using the @ symbol) or not; retweeted(userID,tweetID) 204 states whether a user retweeted a particular tweet or not; containsHashtag(tweetID,hashtag) 205 states whether a tweet contains a particular hashtag or not; finally, verified (userID) 206 states whether a user has been verified or not. Twitter independently verifies user accounts that are of public interest in domains such as government, fashion, music, politics, sports, etc.

The predicate malicious(link) 207 states whether a URL is malicious or not; friend(userID1, userID2) 208 states whether a user denoted by userID1 has a friend denoted by userID2 or not. Twitter defines a friend as someone who a user is following. The predicate trending(hashtag) 209 indicates if a hashtag is trending or not; attacker(userID) 210 indicates whether a user is a suspicious user or not; isFollowedBy(userID1, userID2) 211 indicates whether a user denoted by userID1 is followed by another user denoted by userID2 or not; and finally, isPossiblySensitive(tweetID) 212 indicates whether a tweet is possibly sensitive or not. Twitter flags a tweet as possibly sensitive based on users' feedback.

To model the count information in a tweet, we define a set of predicates as shown in FIG. 2. These predicates are based on a CWA. The predicate friendsCount(userID, count) 213 indicates whether a user has a particular number of friends or not; followersCount(userID, count) 214 indicates whether a user has a particular number of followers or not; statusesCount(userID, count) 215 indicates whether a user has posted a particular number of tweets or not; retweetCount (tweetID, count) 216 indicates whether a tweet has been retweeted a particular number of times or not; and finally, favoritesCount(userID, count) 217 indicates whether a user has "liked" a particular number of tweets or not.

The predicates described thus far do not contain temporal information. One compelling aspect of using a MLN to model tweets is that we can define predicates with temporal variables. These predicates are shown in FIG. 3. The predicate tweetedT(userID, tweetID,$\Delta$) 301 indicates around a particular time A whether a user posted a particular tweet or not; trendingT(hashtag,$\Delta$) 302 indicates around a particular time whether a hashtag is trending or not; followersCountT (userID,count,$\Delta$) 303 indicates around a particular time whether a user has a particular number of followers or not; friendsCount(userID,count,$\Delta$) 304 indicates around a particular time whether a user has a particular number of friends or not; favoritesCount(userID,count,$\Delta$) 305 indicates around a particular time whether a user has liked a particular number of tweets or not; statusesCount(userID,count,$\Delta$) 306 indicates around a particular time whether a user has tweeted a particular number of tweets or not; and finally, retweetCount(tweetID,count,$\Delta$) 307 indicates around a particular time whether a tweet has been retweeted a particular number of times or not. These predicates specify temporal constraints on users' behavior on social media.

At the core of the invention is a set of constraints/first-order formulas defined on the predicates. These formulas were constructed based on the findings in published literature, observing our personal account activities on Twitter, and through intuitive reasoning. These formulas can contradict each other. Each formula will be assigned a weight, which can be learned over a training dataset. A world that violates a formula is less probable but not impossible. A formula with a +ve weight is more likely to be true in the set of possible worlds; a formula with a −ve weight is less likely to be true. A world that violates a hard constraint (assigned the weight ∞) has zero probability.

The first-order formulas are presented in FIG. 4. The existential quantifier ∃ on each variable in a formula is implied. Formula $f_1$ 401 states that if a user mentions another user in his/her tweet, then this implies that the mentioned user is a friend of the user. Formula $f_2$ 402 states that if a user retweets a tweet of another user, then the friend relationship between the two users is implied. Formula $f_3$ 403 states that if a user posted a hashtag and is an attacker/suspicious user, then this implies that the hashtag is trending as adversaries are more likely to target trending hashtags. Formula $f_4$ 404 states that if a user is followed by a verified user, then this implies that the user is also verified/trustworthy.

The next set of formulas infers whether a user is an attacker/suspicious user or not. Formula $f_5$ 405 states that if a user is verified, then he/she is not an attacker; formula $f_6$ 406 states that a friend of a verified user is not an attacker; formula $f_7$ 407 states that a user who posted a tweet containing a malicious link is an attacker; formula $f_8$ 408 states that a friend of an attacker is also an attacker; formula $f_9$ 409 states that if a user, who is not an attacker, mentions another user in his/her tweet, then the other user is not an attacker; and finally, formula $f_{10}$ 410 states that if a user's tweet is known to be possibly sensitive, then he/she is an attacker.

The next set of formulas infers whether a link is malicious or not and whether a tweet is possibly sensitive or not. Formula $f_{11}$ 411 states that a URL containing a certain prefix is not malicious. The prefix can be https://t.co, which indicates the use of Twitter's URL shortening service, or other trusted domains such as https://twitter.com, https://www.instagram, http://pinterest.com, etc. We define this formula as a hard constraint. Formula $f_{12}$ 412 states that a URL contained in a possibly sensitive tweet is malicious; formula $f_{13}$ 413 states that a URL in a tweet posted by an attacker is malicious; formula $f_{14}$ 414 states that a tweet containing a malicious URL is possibly sensitive; and finally, formula $f_{15}$ 415 states that a tweet of an attacker is possibly sensitive.

The next set of formulas shown in FIG. 5 infers attackers based on the counts of certain attributes in the tweets. Formula $f_{16}$ 501 states that if a non-verified user has a very large number of users he/she is following compared to the number of users following him/her, then the user is an attacker. Formula $f_{17}$ 502 states that if a non-verified user is not active on Twitter (based on the number of posts) but has a large number of friends, then the user is an attacker. Formula $f_{18}$ 503 states that if a non-verified user is not active on Twitter (based on the number of posts) but has a large number of followers, then the user is an attacker. Formula $f_{19}$ 504 states that if a non-verified user is not active on Twitter (based on the number of posts) but has liked a large number of tweets, then the user is an attacker. Note that when a user's tweet is liked by someone, then a notification is sent to the user. Thus, a suspicious user can draw the attention of other users to himself/herself by randomly liking their tweets. Similarly, a user can mention any other user in his/her tweet to seek attention. The last set of formulas is defined over predicates with temporal variables. These formulas are powerful to model a sequence of activities, which can be exploited by adversaries to launch cyberattacks. Formula $f_{20}$ 505 states that if the friends count of a user (i.e., the number of users being followed by the user) increases substantially during an interval of time (e.g., in a day), then the user is a suspicious user as he/she is trying to increase their social influence. Formula $f_{21}$ 506 states that if a hashtag is trending at a point in time, and an attacker posts a tweet containing that hashtag a later time, and if the tweet contains a URL, then it is implied to be malicious. This constraint enables us to capture the actions of an attacker who is tracking trending hashtags to post malicious URLs to maximize the scope of an attack. Formulas $f_{22}$ 507 and $f_{23}$ 508 state that if a hashtag is trending at a point in time, and a user posts a tweet containing that hashtag at a later time, and mentions another user who he/she is not following or is not friends with, then the user is an attacker. This constraint allows us to model attackers who can mention other users in their posts randomly just to have malicious content sent to those innocent users.

Discovering Suspicious Users and Malicious Content

To use a MLN for probabilistic inference, three steps are typically followed [2]. The first step is to generate/create an evidence dataset. This dataset contains ground predicates in the KB of the MLN that are known to be satisfied. The second step is to learn the weights of the formulas in the KB given a set of queries, which is of interest during inference. Finally, the third step is to perform probabilistic inference on the set of queries using the learned MLN. If MAP inference is performed, the output will list the ground predicates for the queries that are satisfied for the most likely world. If marginal inference is performed, the output will list the ground predicates for the queries and their probabilities of being satisfied.

Figure 6:
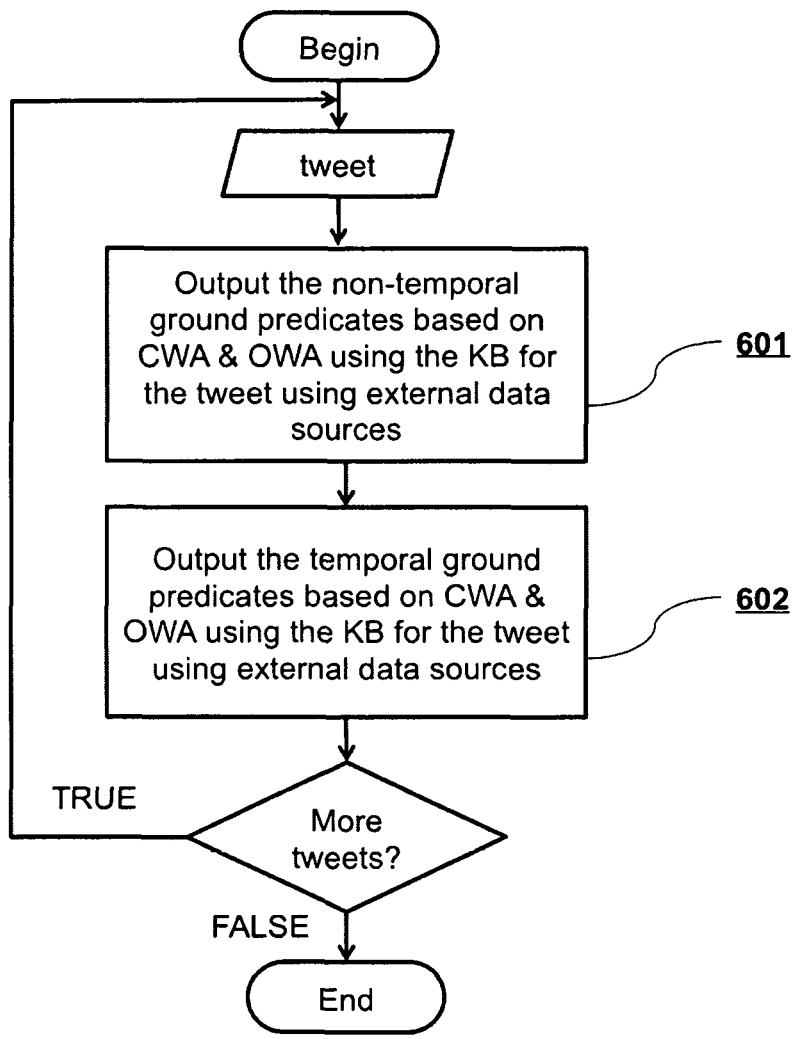
FIG. 6 depicts, in an embodiment of the present invention, the overall steps to generate the evidence dataset containing ground predicates based on the input tweets and external data sources.

FIG. 6 shows how the present invention constructs its evidence dataset from tweets and external data sources. For each tweet, the invention first constructs the non-temporal ground predicates 601 followed by the construction of temporal ground predicates 602. Next, the detailed steps to generate the evidence dataset for the invention are presented.

Figure 7:
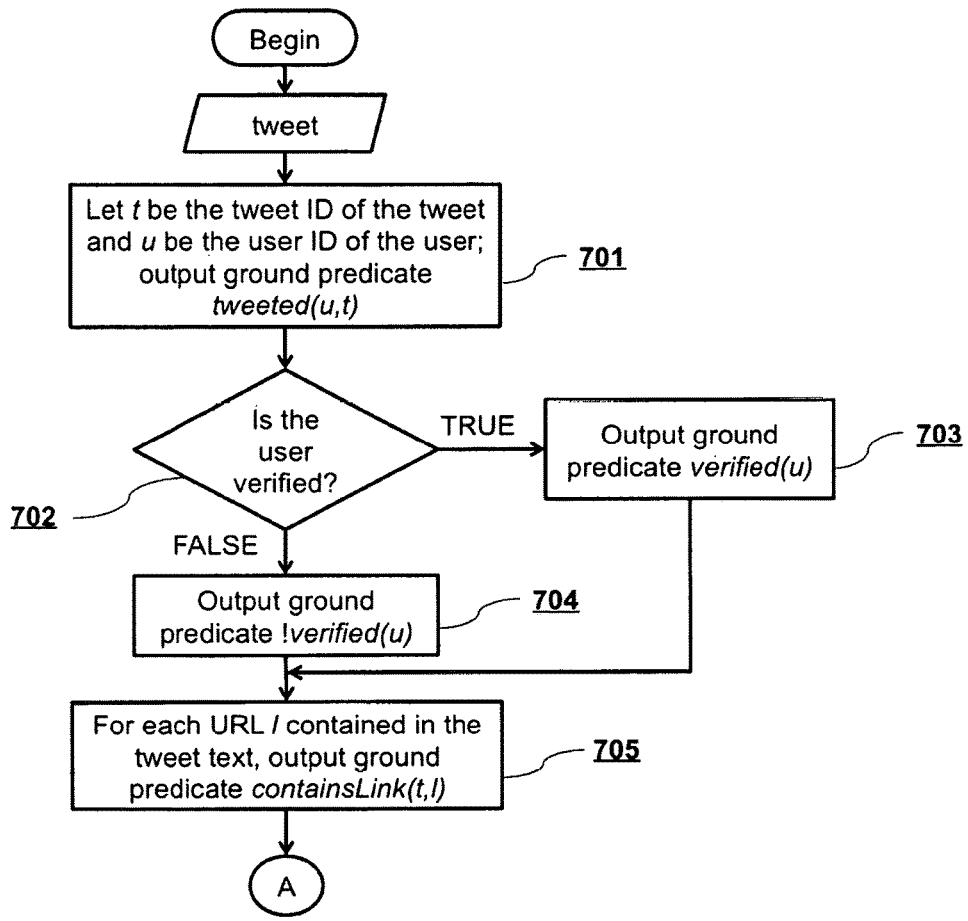
FIG. 7 depicts, in an embodiment of the present invention, the steps involved in generating the ground predicates for tweeted, verified, and containsLink.

The steps to generate some of the ground predicates with non-temporal attributes are shown in FIG. 7. For a tweet, let t denote the ID of the tweet and u denote the ID of the user who posted it. Output tweeted(u,t) 701. Check if the user u is a verified user 702. If true, output verified(u) 703. Otherwise, output !verified(u) 704. For each URL l contained in the tweet's text, output containsLink(t,l) 705.

Figure 8:
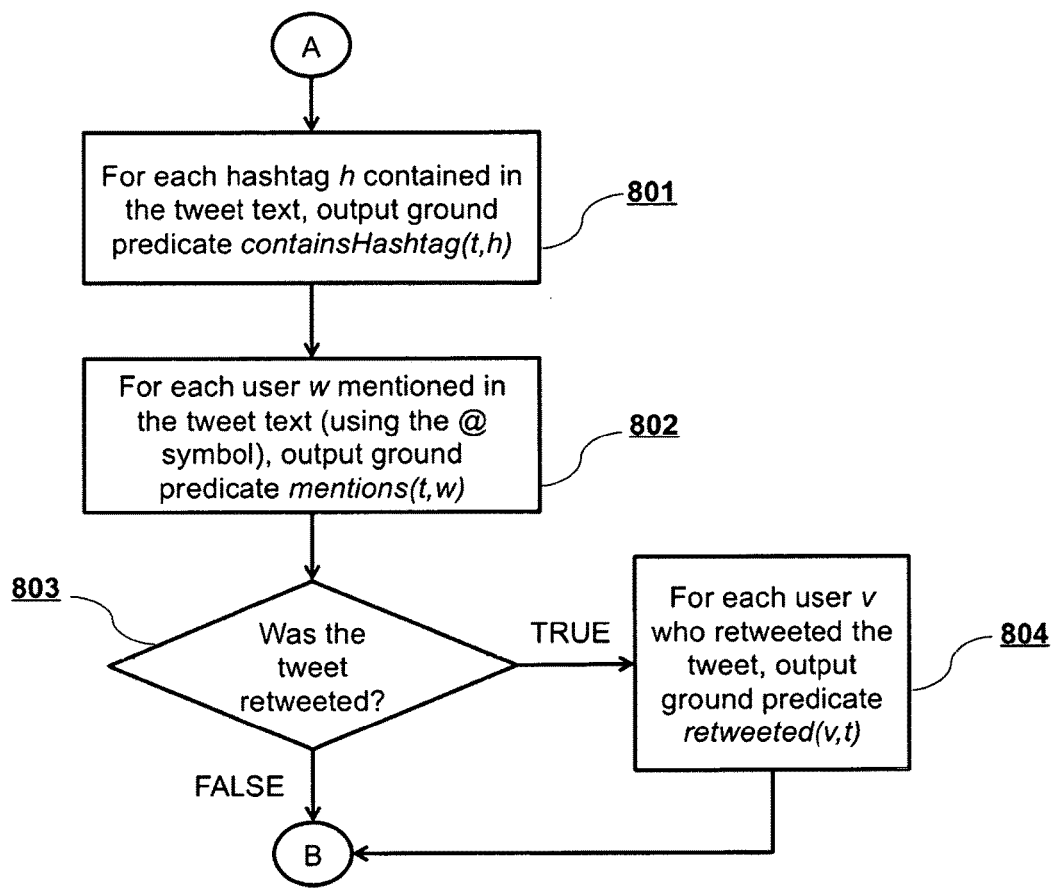
FIG. 8 depicts, in an embodiment of the present invention, the steps involved in generating the ground predicates for containsHashtag, mentions, and retweeted.

The steps to generate the next set of ground predicates are shown in FIG. 8. For each hashtag h in the tweet's text, output containsHashtag(t,h) 801. For each user w mentioned in the tweet's text using the @ symbol, output mentions(t,w) 802. Then check if the tweet has been retweeted 803. If true, for each user v who retweeted the tweet, output retweeted (v,t) 804.

Figure 9:
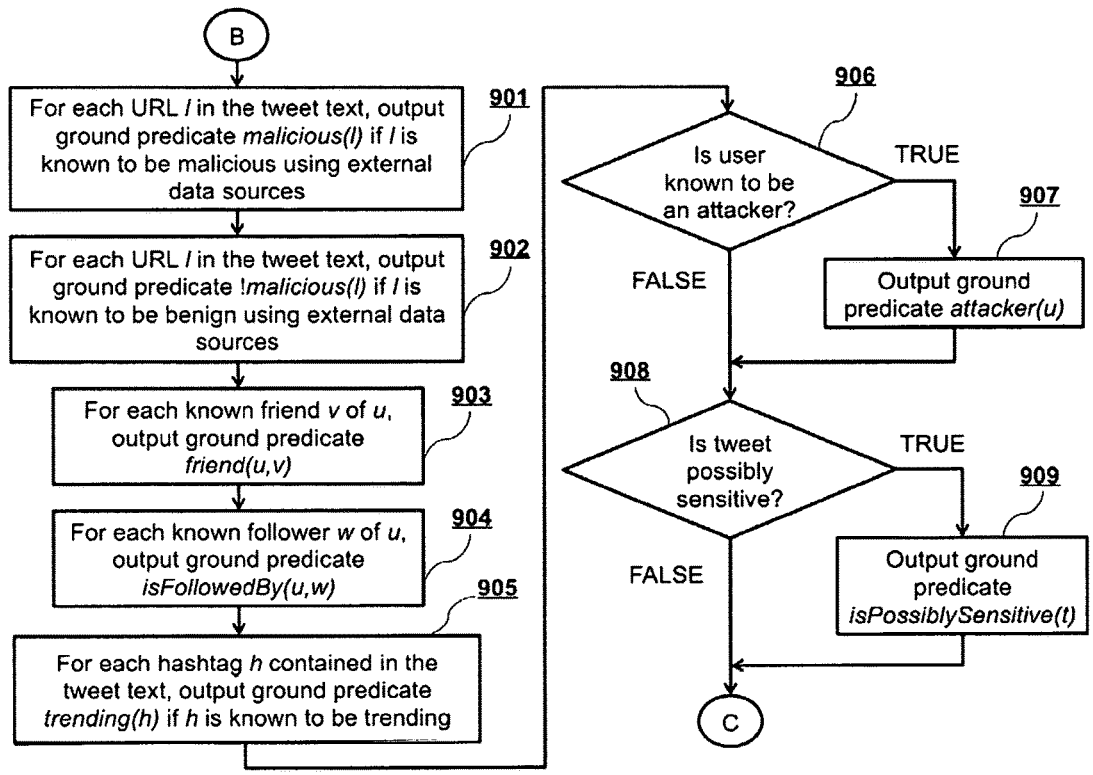
FIG. 9 depicts, in an embodiment of the present invention, the steps involved in generating the ground predicates for malicious, friend, isFollowedBy, trending, attacker, and isPossiblySensitive.

FIG. 9 shows the steps to produce additional ground predicates. For each URL l contained in the tweet's text, output malicious(l) if l is known to be malicious based on external data sources 901. If l is known to be benign, then output !malicious(l) 902. Next, for each known friend v of the user u, output friend(u,v) 903. For each known follower w of u, output isFollowedBy(u,w) 904. For each hashtag h contained in the tweet's text, output trending(h) if h is reported to be a trending hashtag by Twitter 905. Check if u is known to be attacker (e.g., his/her account has been suspended by Twitter) 906. If true, then output attacker(u) 907. Check if t is marked as possibly sensitive 908. If true, then output isPossiblySensitive(t) 909.

Figure 10:
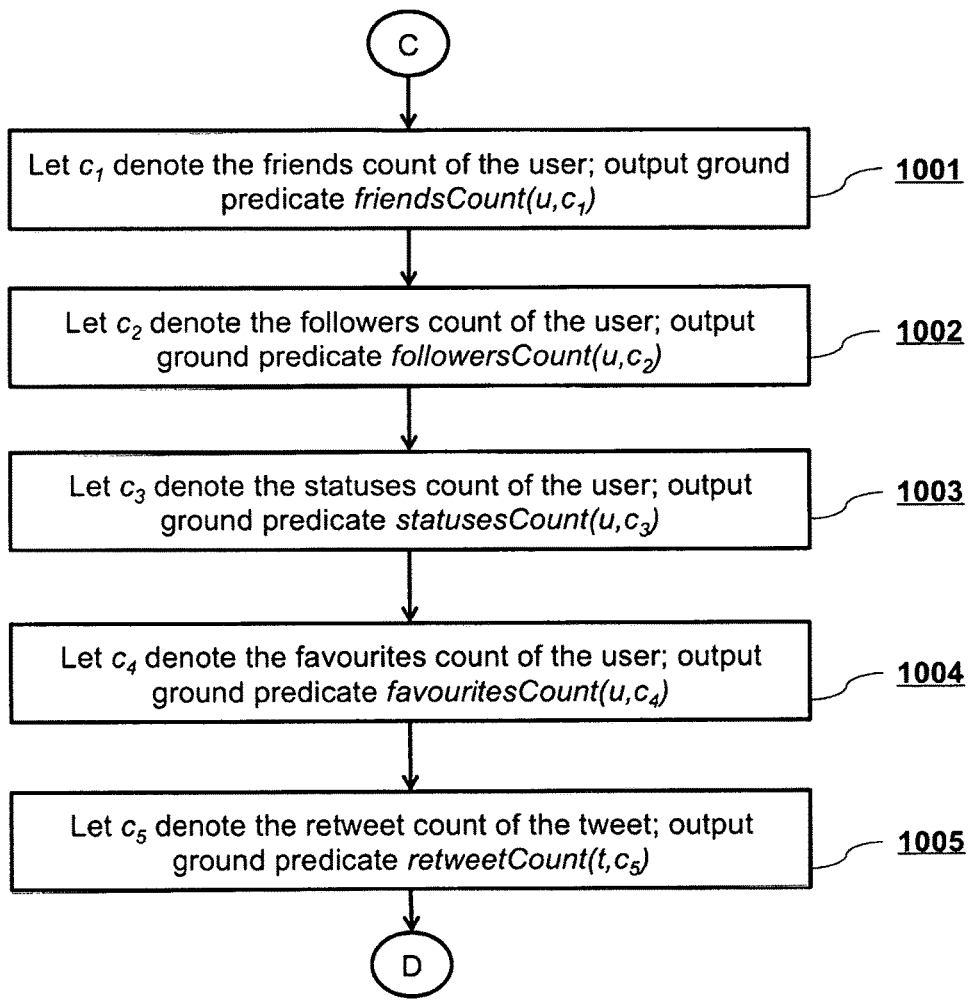
FIG. 10 depicts, in an embodiment of the present invention, the steps involved in generating the ground predicates for friendsCount, followersCount, statusesCount, favoritesCount, and retweetCount

Next, the ground predicates for counts are discussed in FIG. 10. If $c_1$ denotes the number of friends of u, output friendsCount(u,$c_1$) 1001. If $c_2$ denotes the number of followers of u, outputfollowersCount(u,$c_2$) 1002. If $c_3$ denotes the number of tweets posted by u (a.k.a. statuses count), output statusesCount(u,$c_3$) 1003. If $c_4$ denotes the number of tweets liked/favorited by u, output favoritesCount(u,$c_4$) 1004. If $c_5$ denotes the number of times t has been retweeted, output retweetCount(t,$c_5$) 1005.

Figure 11:
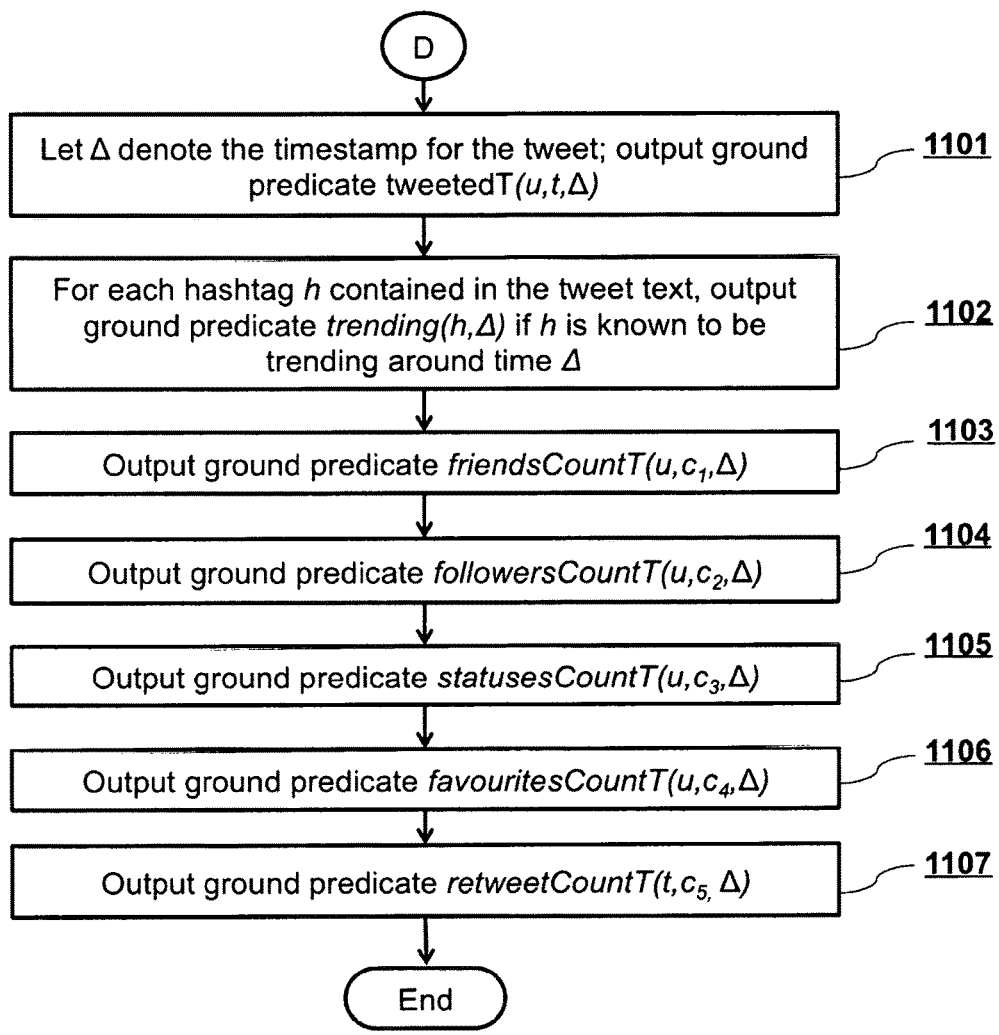
FIG. 11 depicts, in an embodiment of the present invention, the steps involved in generating the ground predicates for predicates with temporal attributes, namely, tweetedT, trendingT, friendsCountT, followersCountT, statusesCountT, favoritesCountT, and retweetCountT

FIG. 11 shows the steps to generate ground predicates for predicates with temporal attributes. Suppose $\Delta$ is the timestamp of the tweet. Then output tweetedT(u,t,$\Delta$) 1101. For each hashtag h contained in the tweet's text, output trendingT(h,$\Delta$) if h is reported to be trending by Twitter around time Δ 1102. Then output friendsCountT(u,$c_1$,Δ) 1103; output followersCountT(u,$c_2$,Δ) 1104; output statusesCountT(u,$c_3$,Δ) 1105; output favorilesCountT(u,$c_4$,Δ) 1106; and lastly, output retweetCountT(t,$c_5$, Δ) 1107.

Once the evidence dataset is constructed, the invention accepts a set of query predicates provided by the user for weight learning and probabilistic inference. For example, attacker (u), malicious(l), and isPossiblySensitive(t) denotes a possible set of queries to discover suspicious users and malicious content. Weight learning and probabilistic inference can be done using scalable MLN implementations [2, 1].

Figure 12:
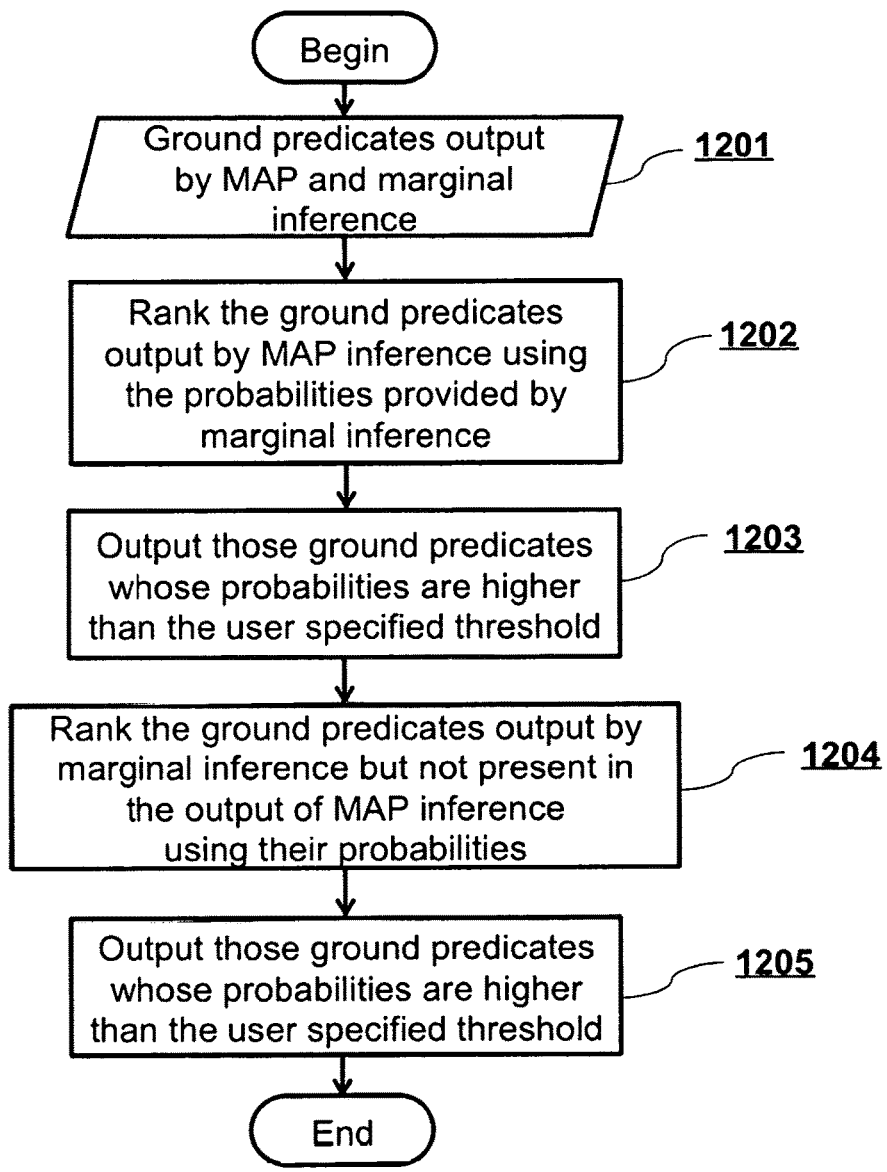
FIG. 12 depicts, in an embodiment of the present invention, the steps involved in combining the output of the two different inference tasks to provide higher quality information to the user.

The invention combines the outputs of the MAP and marginal inference tasks as shown in FIG. 12 to provide higher quality information to the user. The outputs of the MAP and marginal inference tasks constitute the input 1201. The invention ranks the ground predicates output by MAP inference using the probabilities provided by marginal inference 1202. It outputs those ground predicates whose probabilities are higher than the user specified threshold 1203. It ranks the ground predicates output by marginal inference that are not present in the output of MAP inference using their probabilities 1204. It outputs those ground predicates whose probabilities are higher than the user specified threshold 1205. The two sets of ground predicates is reviewed by the user for further decision-making.

The present invention can be implemented on a single server or a cluster of commodity servers containing general-purpose processors, memory, and storage (e.g., hard disk, SSD). The authors of SocialKB [3] demonstrated an implementation of the method on a single server machine.

What is claimed is:

1. An article of manufacture comprising a non-transitory storage medium having a plurality of programming instructions stored therein, the programming instructions being configured to program an apparatus to implement on the apparatus one or more subsystems or services to analyze Twitter data to discover suspicious users and malicious content with following steps:
    collecting, at the one or more subsystems or services, tweets from Twitter via a communications channel;
    flagging malicious and benign URLs and domains contained in said tweets and collected from at least one externally stored data source;
    generating ground predicates based on said tweets, said flagged URLs and domains, and a knowledge base of predicates and formulas, wherein said knowledge base contains and is updated with first order predicates and formulas that capture the content of said tweets and behaviors of Twitter users;
    generating a subset of said ground predicates based on a specified input set of queries received from a user interface;
    learning weights of said formulas based on said generated subset of ground predicates, said tweets, and said knowledge base using scalable Markov Logic Network (MLN) implementation;
    performing probabilistic inference on said queries based on said updated knowledge base;
    combining results from different inference tasks; and
    outputting suspicious Twitter users and malicious Twitter content.

2. The article of manufacture of claim 1 where said malicious and benign URLs and domains are collected from external data sources.

3. The article of manufacture of claim 1 where said apparatus having one or more subsystems or services comprises at least one server.

4. The article of manufacture of claim 1 where said predicates further comprise predicates with non-temporal attributes and predicates with temporal attributes.

5. The article of manufacture of claim 4 where a said non-temporal predicate performs a function selected from the group consisting of functions that:
    state whether a user posted a particular tweet;
    indicate whether a tweet contains a particular URL;
    state whether a particular user is mentioned in a tweet;
    state whether a user retweeted a particular tweet;
    state whether a tweet contains a particular hashtag;
    state whether a user has been verified or not;
    state whether a URL is malicious or not;
    state whether a particular user ID has a particular friend user ID;
    state whether a particular hashtag is trending;
    state whether a particular user is suspicious or not;
    state whether a particular user ID is followed by a particular friend user ID;
    indicate whether a tweet is sensitive or not;
    indicate whether a user has a particular number of friends;
    indicate whether a user has a particular number of followers;
    indicate whether a user has posted a particular number of tweets;
    indicate whether a tweet has been retweeted a particular number of times; and
    indicate whether a user has liked a particular number of tweets, or any combination thereof.

6. The article of manufacture of claim 4 where a said temporal predicate performs a function selected from the group consisting of functions that:
    indicate the approximate time a user posted a particular tweet;
    indicate the approximate time a hashtag is trending;
    indicate the approximate time a user has a particular number of followers;
    indicate the approximate time a user has a particular number of friends;
    indicate the approximate time a user has liked a particular number of tweets;
    indicate the approximate time a user has tweeted a particular number of tweets; and
    indicate the approximate time a tweet has been retweeted a particular number of times,
    or any combination thereof.

7. The article of manufacture of claim 4 where generating ground predicates further comprises:
    for a said tweet, outputting said non-temporal ground predicates based on closed world assumptions and open world assumptions using said knowledgebase and external data sources;
    for a said tweet, outputting said temporal ground predicates based on closed world assumptions and open world assumptions using said knowledgebase and external data sources; and
    analyzing a next said tweet.

8. The article of manufacture of claim 4, where generating ground predicates with temporal attributes further comprises outputting a ground predicate that performs a function selected from the group consisting of functions that denote:
    a timestamp of a tweet;
    an identification of a hashtag that is trending at approximately the time of said timestamp;

a count of friends at approximately the time of said timestamp;

a count of followers at approximately the time of said timestamp;

a count of statuses at approximately the time of said timestamp;

a count of favorites at approximately the time of said timestamp; and a count of retweets at approximately the time of said timestamp, or any combination thereof.

9. The article of manufacture of claim 4 where combining results further comprises ranking those ground predicates generated by maximum a posteriori inference according to probabilities generated by marginal inference;

outputting those said ground predicates higher than a first predetermined probability;

ranking those ground predicates not having been generated by maximum a posteriori inference according to probabilities generated by marginal inference; and outputting those said ground predicates higher than a second predetermined probability.

10. The article of manufacture of claim 1 where a said formula performs a function selected from the group consisting of functions that:

state that if a first user mentions a second user in his/her tweet, then said second user is deemed a friend of said first user;

state that if a first user retweets a tweet of a second user, then a friend relationship between said first user and said second user is implied;

state that if a user posted a hashtag and is an attacker/suspicious user, then said hashtag is trending;

state that if a first user is followed by a verified user, then said first user is deemed a verified/trustworthy user;

state that if a user is verified, then said user is not an attacker;

state that a friend of a verified user is not an attacker;

state that a user who posted a tweet containing a malicious link is an attacker;

state that a friend of an attacker is also an attacker;

state that if a first user, who is not an attacker, mentions a second user in said first user's tweet, then said second user is not an attacker; and state that if a user's tweet is known to be possibly sensitive, then said user is an attacker, or any combination thereof.

11. The article of manufacture of claim 1 where a said formula performs a function selected from the group consisting of functions that:

state that a URL containing a certain prefix is not malicious;

state that a URL contained in a possibly sensitive tweet is malicious;

state that a URL in a tweet posted by an attacker is malicious;

state that a tweet containing a malicious URL is possibly sensitive; and state that a tweet of an attacker is possibly sensitive, or any combination thereof.

12. The article of manufacture of claim 1 where a said formula performs a function selected from the group consisting of functions that:

state that if a non-verified user has a very large number of users he is following compared to the number of users following him, then said non-verified user is an attacker;

state that if a non-verified user is not deemed active on Twitter based on the number of posts but has a large number of friends, then said non-verified user is an attacker;

state that if a non-verified user is not deemed active on Twitter based on the number of posts but has a large number of followers, then said non-verified user is an attacker;

state that if a non-verified user is not deemed active on Twitter based on the number of posts but has liked a large number of tweets, then said non-verified user is an attacker;

state that if the friends count of a user increases substantially during a specified interval of time, then said user is a suspicious user attempting to increase his social influence;

state that if a hashtag is trending at a point in time, and an attacker posts a tweet containing said hashtag at a later time, and if said tweet contains a URL, then said URL deemed to be malicious; and state that if a hashtag is trending at a point in time, and a first user posts a tweet containing said hashtag at a later time wherein said first user mentions a second user who said user is not following or is not friends with, then said first user is an attacker, or any combination thereof.

13. The article of manufacture of claim 1 where generating ground predicates further comprises:

outputting a ground predicate based on the tweet I.D. and the user I.D. associated with said tweet;

outputting a ground predicate that indicates said user is verified when said user is verified;

outputting a ground predicate that indicates said user is not verified when said user in not verified; and outputting for each URL contained in said tweet, a statement that said ground predicate contains links to said URL.

14. The article of manufacture of claim 1 where generating ground predicates further comprises:

outputting for each particular hashtag contained in said tweet, a ground predicate that indicates said ground predicate contains said particular hashtag;

outputting for each particular user mentioned in said tweet, a ground predicate that indicates said ground predicate mentions said particular user; and outputting for each particular user who retweeted said tweet, a ground predicate that indicates said particular user retweeted said tweet.

15. The article of manufacture of claim 1 where generating ground predicates further comprises:

outputting for each particular URL contained in said tweet, a ground predicate that indicates said URL is malicious when said URL is known to be malicious;

outputting for each particular URL contained in said tweet, a ground predicate that indicates said URL is not malicious when said URL is known to be benign;

outputting for each known friend of a particular user, a ground predicate that indicates said friendship;

outputting for each known follower of a particular user, a ground predicate that indicates said following;

outputting for each particular hashtag contained in said tweet, a ground predicate that indicates said particular hashtag is trending when said particular hashtag is trending;

outputting for each particular user known to be an attacker, a ground predicate that indicates said particular user is an attacker; and outputting for each tweet that is possibly sensitive, a ground predicate that indicates said tweet is possibly sensitive.

16. The article of manufacture of claim 1 where generating ground predicates further comprises outputting a ground predicate that performs a function selected from the group consisting of functions that denote:
the friends count of said user;
the followers count of said user;
the statuses count of said user;
the favorites count of said user; and
the retweet count of a tweet,
or any combination thereof.

17. The article of manufacture of claim 1 where results are combined through a Markov Logic Network process on said learned weights and said probabilistic inference.

18. A system for analyzing Twitter data to discover suspicious users and malicious content, comprising:
at least one computer server executing a plurality of programming instructions stored therein;
at least one source of externally stored data;
a communications channel for receiving tweets from Twitter; and
a user interface for querying said at least one computer server; and
said programming instructions configured to program said computer server to perform tasks, said tasks further comprising:
collecting, at said at least one computer server, tweets from Twitter via the communications channel;
flagging malicious and benign URLs and domains contained in said tweets and collected from the at least one externally stored data source;
generating ground predicates based on said tweets, said flagged URLs and domains, and a knowledge base of predicates and formulas, wherein said knowledge base contains and is updated with first order predicates and formulas that capture the content of said tweets and behaviors of Twitter users;
generating a subset of said ground predicates based on a specified input set of queries received from a user interface;
learning weights of said formulas based on said generated subset of ground predicates, said tweets, and said knowledge base using scalable Markov Logic Network (MLN) implementation;
performing probabilistic inference on said queries based on said updated knowledge base;
combining results from different inference tasks; and
outputting suspicious Twitter users and malicious Twitter content.

19. The system of claim 18 where said tasks further comprise:
generating ground predicates based on:
received tweets,
Twitter users' information,
malicious and benign URLs, and
a knowledge base of predicates and formulas;
updating said knowledge base with first order formulas to capture the nature of the content in said tweets and Twitter users' behavior;
defining an input set of queries to learn weights of the said formulas on said ground predicates;
performing probabilistic inference on said queries based on said updated knowledge base;
combining results; and
outputting suspicious Twitter users and malicious Twitter content.

20. The system of claim 19 where said predicates further comprise predicates with non-temporal attributes and predicates with temporal attributes.

21. The system of claim 19 where a said non-temporal predicate performs a function selected from the group consisting of functions that:
state whether a user posted a particular tweet;
indicate whether a tweet contains a particular URL;
state whether a particular user is mentioned in a tweet;
state whether a user retweeted a particular tweet;
state whether a tweet contains a particular hashtag;
state whether a user has been verified;
state whether a URL is malicious or not;
state whether a particular user ID has a particular friend user ID;
state whether a particular hashtag is trending;
state whether a particular user is suspicious or not;
state whether a particular user ID is followed by a particular friend user ID;
indicate whether a tweet is sensitive or not;
indicate whether a user has a particular number of friends;
indicate whether a user has a particular number of followers;
indicate whether a user has posted a particular number of tweets;
indicate whether a tweet has been retweeted a particular number of times; and
indicate whether a user has liked a particular number of tweets,
or any combination thereof.

22. The system of claim 19 where a said temporal predicate performs a function selected from the group consisting of functions that:
indicate the approximate time a user posted a particular tweet;
indicate the approximate time a hashtag is trending;
indicate the approximate time a user has a particular number of followers;
indicate the approximate time a user has a particular number of friends;
indicate the approximate time a user has liked a particular number of tweets;
indicate the approximate time a user has tweeted a particular number of tweets; and
indicate the approximate time a tweet has been retweeted a particular number of times,
or any combination thereof.

23. The system of claim 19 where a said formula performs a function selected from the group consisting of functions that:
state that if a first user mentions a second user in his/her tweet, then said second user is deemed a friend of said first user;
state that if a first user retweets a tweet of a second user, then a friend relationship between said first user and said second user is implied;

state that if a user posted a hashtag and is an attacker/suspicious user, then said hashtag is trending;

state that if a first user is followed by a verified user, then said first user is deemed a verified/trustworthy user;

state that if a user is verified, then said user is not an attacker;

state that a friend of a verified user is not an attacker;

state that a user who posted a tweet containing a malicious link is an attacker;

state that a friend of an attacker is also an attacker;

state that if a first user, who is not an attacker, mentions a second user in said first user's tweet, then said second user is not an attacker; and state that if a user's tweet is known to be possibly sensitive, then said user is an attacker, or any combination thereof.

24. The system of claim 19 where a said formula performs a function selected from the group consisting of functions that:

state that a URL containing a certain prefix is not malicious;

state that a URL contained in a possibly sensitive tweet is malicious;

state that a URL in a tweet posted by an attacker is malicious;

state that a tweet containing a malicious URL is possibly sensitive; and state that a tweet of an attacker is possibly sensitive, or any combination thereof.

25. The system of claim 19 where a said formula performs a function selected from the group consisting of functions that:

state that if a non-verified user has a very large number of users he is following compared to the number of users following him, then said non-verified user is an attacker;

state that if a non-verified user is not deemed active on Twitter based on the number of posts but has a large number of friends, then said non-verified user is an attacker;

state that if a non-verified user is not deemed active on Twitter based on the number of posts but has a large number of followers, then said non-verified user is an attacker;

state that if a non-verified user is not deemed active on Twitter based on the number of posts but has liked a large number of tweets, then said non-verified user is an attacker;

state that if the friends count of a user increases substantially during a specified interval of time, then said user is a suspicious user attempting to increase his social influence;

state that if a hashtag is trending at a point in time, and an attacker posts a tweet containing said hashtag at a later time, and if said tweet contains a URL, then said URL deemed to be malicious; and state that if a hashtag is trending at a point in time, and a first user posts a tweet containing said hashtag at a later time wherein said first user mentions a second user who said user is not following or is not friends with, then said first user is an attacker, or any combination thereof.

26. The system of claim 19 where generating ground predicates further comprises:

for a said tweet, outputting said non-temporal ground predicates based on closed world assumptions and open world assumptions using said knowledgebase and external data sources;

for a said tweet, outputting said temporal ground predicates based on closed world assumptions and open world assumptions using said knowledgebase and external data sources; and analyzing a next said tweet.

27. The system of claim 19 where generating ground predicates further comprises:

outputting a ground predicate based on the tweet I.D. and the user I.D. associated with said tweet;

outputting a ground predicate that indicates said user is verified when said user is verified;

outputting a ground predicate that indicates said user is not verified when said user is not verified; and outputting for each URL contained in said tweet, a statement that said ground predicate contains links to said URL.

28. The system of claim 19 where generating ground predicates further comprises:

outputting for each particular hashtag contained in said tweet, a ground predicate that indicates said ground predicate contains said particular hashtag;

outputting for each particular user mentioned in said tweet, a ground predicate that indicates said ground predicate mentions said particular user; and outputting for each particular user who retweeted said tweet, a ground predicate that indicates said particular user retweeted said tweet.

29. The system of claim 19 where generating ground predicates further comprises:

outputting for each particular URL contained in said tweet, a ground predicate that indicates said URL is malicious when said URL is known to be malicious;

outputting for each particular URL contained in said tweet, a ground predicate that indicates said URL is not malicious when said URL is known to be benign;

outputting for each known friend of a particular user, a ground predicate that indicates said friendship;

outputting for each known follower of a particular user, a ground predicate that indicates said following;

outputting for each particular hashtag contained in said tweet, a ground predicate that indicates said particular hashtag is trending when said particular hashtag is trending;

outputting for each particular user known to be an attacker, a ground predicate that indicates said particular user is an attacker; and outputting for each tweet that is possibly sensitive, a ground predicate that indicates said tweet is possibly sensitive.

30. The system of claim 19 where generating ground predicates further comprises outputting a ground predicate that denotes at least one of the following:

the friends count of said user;

the followers count of said user;

the statuses count of said user;

the favorites count of said user; and the retweet count of a tweet, or any combination thereof.

31. The system of claim 19 where generating ground predicates with temporal attributes further comprises outputting a ground predicate that performs a function selected from the group consisting of functions that denote:

a timestamp of a tweet;

an identification of a hashtag that is trending at approximately the time of said timestamp;
a count of friends at approximately the time of said timestamp;
a count of followers at approximately the time of said timestamp;
a count of statuses at approximately the time of said timestamp;
a count of favorites at approximately the time of said timestamp; and
a count of retweets at approximately the time of said timestamp,
or any combination thereof.

32. The system of claim 19 where combining results further comprises
ranking those ground predicates generated by maximum a posteriori inference according to probabilities generated by marginal inference;
outputting those said ground predicates higher than a first predetermined probability;
ranking those ground predicates not having been generated by maximum a posteriori inference according to probabilities generated by marginal inference; and
outputting those said ground predicates higher than a second predetermined probability.

* * * * *